(12) United States Patent
Sakurada

(10) Patent No.: US 10,879,770 B2
(45) Date of Patent: Dec. 29, 2020

(54) INTEGRATED ROTATING ELECTRIC APPARATUS

(71) Applicant: HONDA MOTOR CO., LTD., Tokyo (JP)

(72) Inventor: Manabu Sakurada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 184 days.

(21) Appl. No.: 16/170,419

(22) Filed: Oct. 25, 2018

(65) Prior Publication Data

US 2019/0123619 A1    Apr. 25, 2019

(30) Foreign Application Priority Data

Oct. 25, 2017 (JP) ................................. 2017-205686

(51) Int. Cl.
*H02K 9/19*       (2006.01)
*H02K 5/20*       (2006.01)
*H02K 9/193*      (2006.01)
*H02K 11/33*      (2016.01)
*H02K 7/116*      (2006.01)

(52) U.S. Cl.
CPC .............. *H02K 9/193* (2013.01); *H02K 5/20* (2013.01); *H02K 7/116* (2013.01); *H02K 11/33* (2016.01)

(58) Field of Classification Search
CPC .......... H02K 9/19; H02K 9/193; H02K 11/33; H02K 11/30; H02K 7/116; H02K 5/20; B60K 6/26; B60K 6/405; B60K 6/445
See application file for complete search history.

(56) References Cited

U.S. PATENT DOCUMENTS 6,201,365 B1 *   3/2001  Hara ..................... B60K 6/26
                                            318/558
6,914,354 B2 *   7/2005  Seniawski ............ B60K 6/26
                                             310/52
(Continued)

FOREIGN PATENT DOCUMENTS

CN      106411050 A      2/2017
JP      2000-295818 A    10/2000
(Continued)

OTHER PUBLICATIONS

Office Action dated Jun. 4, 2019, issued in counterpart JP Application No. 2017-205686, with English translation (5 pages).
(Continued)

*Primary Examiner* — Edgardo San Martin
(74) *Attorney, Agent, or Firm* — Westerman, Hattori, Daniels & Adrian, LLP

(57) ABSTRACT

A motor, a PDU that is disposed above the motor and that supplies driving electric power to the motor, and a cooling device that cools the motor and the PDU are accommodated in a casing. The cooling device includes an oil cooling system that drips cooling oil onto the motor and a water cooling system that cools the motor and the PDU by using cooling water. The oil cooling system includes a storage chamber that temporarily stores the cooling oil and that has a plurality of dripping holes for dripping the cooling oil. The storage chamber is disposed above the motor and below the PDU, and the cooling oil stored in the storage chamber is coolable by the cooling water of the water cooling system.

5 Claims, 3 Drawing Sheets

(56) References Cited

U.S. PATENT DOCUMENTS

| | | | | |
|---|---|---|---|---|
| 7,775,060 B2* | 8/2010 | Nakajima | ............... | H02K 11/33 |
| | | | | 62/259.2 |
| 8,456,045 B2* | 6/2013 | Hayashi | ............... | F16H 57/0412 |
| | | | | 310/57 |
| 8,810,087 B2* | 8/2014 | Dorr | ............... | H02K 9/10 |
| | | | | 310/64 |
| 8,875,825 B2* | 11/2014 | Asakura | ................ | B60K 6/405 |
| | | | | 180/68.4 |
| 8,896,166 B2* | 11/2014 | Hofkirchner | ............ | H02K 5/20 |
| | | | | 310/54 |
| 8,992,368 B2* | 3/2015 | Terauchi | .................. | H02K 9/22 |
| | | | | 475/159 |
| 9,660,506 B2* | 5/2017 | Yoshiizumi | ............... | H02K 9/19 |
| 9,881,019 B2* | 1/2018 | Matsuo | .................... | H02K 5/20 |
| 10,272,767 B1* | 4/2019 | Tang | ........................ | F01P 5/10 |
| 2012/0293027 A1* | 11/2012 | Sakurada | ................ | H02K 5/10 |
| | | | | 310/89 |
| 2019/0207478 A1* | 7/2019 | Yamaguchi | .............. | H02K 9/19 |
| 2019/0280564 A1* | 9/2019 | Pal | ......................... | H02K 11/33 |
| 2020/0136471 A1* | 4/2020 | Fukunaga | .............. | H02K 11/33 |

FOREIGN PATENT DOCUMENTS

| | | |
|---|---|---|
| JP | 2001-238405 A | 8/2001 |
| JP | 2011-182480 A | 9/2011 |
| JP | 2012-9565 A | 1/2012 |
| JP | 2014225969 A * | 12/2014 |

OTHER PUBLICATIONS

Office Action dated May 12, 2020, issued in counterpart CN Application No. 201811228230.8, with English Translation and Search Report. (11 pages).

* cited by examiner

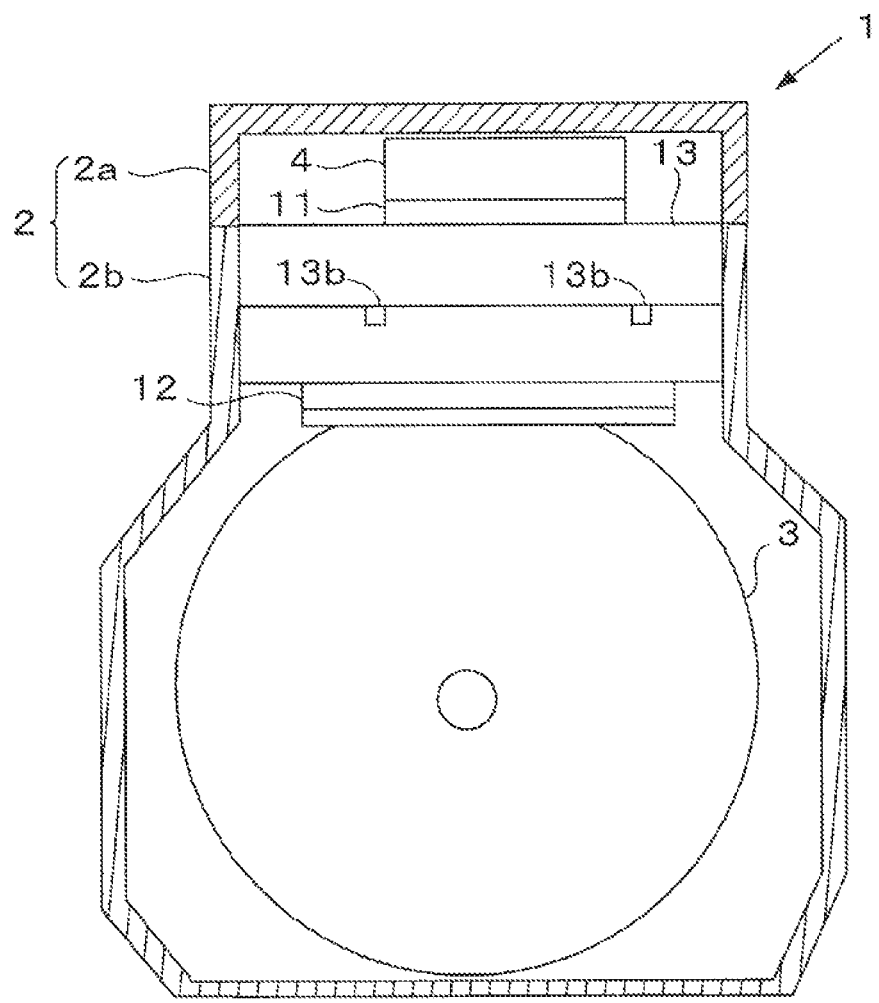

INTEGRATED ROTATING ELECTRIC APPARATUS

CROSS REFERENCES TO RELATED APPLICATIONS

The present application claims priority under 35 U.S.C. § 119 to Japanese Patent Application No. 2017-205686, filed Oct. 25, 2017, entitled "Integrated Rotating Electric Apparatus." The contents of this application are incorporated herein by reference in their entirety.

TECHNICAL FIELD

The present disclosure relates to an integrated rotating electric apparatus, and, in particular, to the structure of a cooling device included in the integrated rotating electric apparatus.

BACKGROUND

Japanese Unexamined Patent Application Publication No. 2011-182480 describes an integrated rotating electric apparatus in which a rotating electric machine and an electric power converter (inverter) are integrated. The integrated rotating electric apparatus includes a cooling device in which a cooling water channel of the rotating electric machine also serves as a cooling water channel of the inverter. In this apparatus, a power module including the inverter is disposed above the rotating electric machine, and the cooling water channel extends around the outer periphery of the rotating electric machine from a lower part of the power module. The power module and the rotating electric machine are cooled by causing cooling water to flow through the cooling water channel.

Japanese Unexamined Patent Application Publication No. 2012-9565 describes a cooling mechanism for a vehicle driving apparatus that includes a gear mechanism for driving the driving wheels of a vehicle and two rotating electric machines. The cooling mechanism cools a reactor of the rotating electric machines by using lubrication oil of the gear mechanism. The cooling mechanism includes an oil pan, for storing lubrication oil, in a lowest part of the vehicle driving apparatus. The lubrication oil stored in the oil pan is splashed upward by a rotating gear, and the lubrication oil drips onto the reactor of the rotating electric machines.

When a high power is required for an integrated rotating electric apparatus having a comparatively small size, it is necessary to increase the cooling effect of a cooling device included in the integrated rotating electric apparatus while avoiding an increase in the size of the apparatus. In the apparatus described in Japanese Unexamined Patent Application Publication No. 2011-182480, the power module and the rotating electric machine are cooled by using cooling water. However, in order to obtain a greater cooling effect, it is desirable to also use lubrication oil to cool the rotating electric machine as in the apparatus described in Japanese Unexamined Patent Application Publication No. 2012-9565. However, because the apparatus described in Japanese Unexamined Patent Application Publication No. 2012-9565 does not have a mechanism for cooling the lubrication oil, when the rotating electric machine and the power module generates a large amount of heat, a sufficient cooling effect cannot be obtained by using the lubrication oil.

SUMMARY

The present disclosure provides an integrated rotating electric apparatus that includes a cooling device that can obtain a sufficient cooling effect without increasing the size of the apparatus when a high power is required for the apparatus with a comparative small size.

A rotating electric machine according to one aspect of the present disclosure includes a rotating electric machine (3), a drive unit (4) that is disposed above the rotating electric machine (3) and that supplies driving electric power to the rotating electric machine (3), a cooling device that cools the rotating electric machine (3) and the drive unit (4), and a casing (2) that accommodates the rotating electric machine (3), the drive unit (4), and the cooling device. The cooling device includes an oil cooling system that drips cooling oil onto the rotating electric machine (3), and a water cooling system that cools the rotating electric machine (3) and the drive unit (4) by using cooling water. The oil cooling system includes a storage chamber (13) that temporarily stores the cooling oil and that has a plurality of dripping holes (13b) for dripping the cooling oil, the storage chamber (13) being disposed above the rotating electric machine (3) and below the drive unit (4). The cooling oil stored in the storage chamber (13) is coolable by the cooling water of the water cooling system.

With this structure, the oil cooling system cools the rotating electric machine, and the water cooling system cools the rotating electric machine and the drive unit, which supplies driving electric power to the rotating electric machine. Moreover, the cooling oil is temporarily stored in the storage chamber, which is disposed between the rotating electric machine and the drive unit, and is cooled by the cooling water of the water cooling system. Accordingly, even when the rotating electric machine and the drive unit generate a large amount of heat, it is possible to obtain a sufficient cooling effect, in particular, by increasing the cooling effect of the cooling oil. Moreover, it is possible to suppress increase in the size of the apparatus, because the storage chamber of cooling oil is disposed in a space between the rotating electric machine and the drive unit.

In the integrated rotating electric apparatus, the water cooling system may include a first water jacket (11) disposed directly below the drive unit (4) and a second water jacket (12) disposed directly above the rotating electric machine (3), and the storage chamber (13) may be disposed in a space between the first and second water jackets (11, 12) so as to be adjacent to the first and second water jackets (11, 12).

With this structure, heat exchange between the cooling water in the first and second water jackets and the cooling oil in the storage chamber is accelerated. Therefore, it is possible to increase the cooling effect of the cooling oil.

The integrated rotating electric apparatus may further include a gear mechanism (5) that is disposed in a vicinity of the rotating electric machine (3) and that transmits output torque of the rotating electric machine (3), and the cooling oil may be lubrication oil of the gear mechanism (5).

With this structure, because lubrication oil of the gear mechanism is used as cooling oil of the rotating electric machine, it is not necessary to use an independent oil pump for supplying cooling oil to the storage chamber. Therefore, it is possible to simplify the structure of the apparatus. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

FIG. 2 illustrates the main part shown in FIG. 1, as viewed from the right side of FIG. 1.

DETAILED DESCRIPTION

Figure 1:
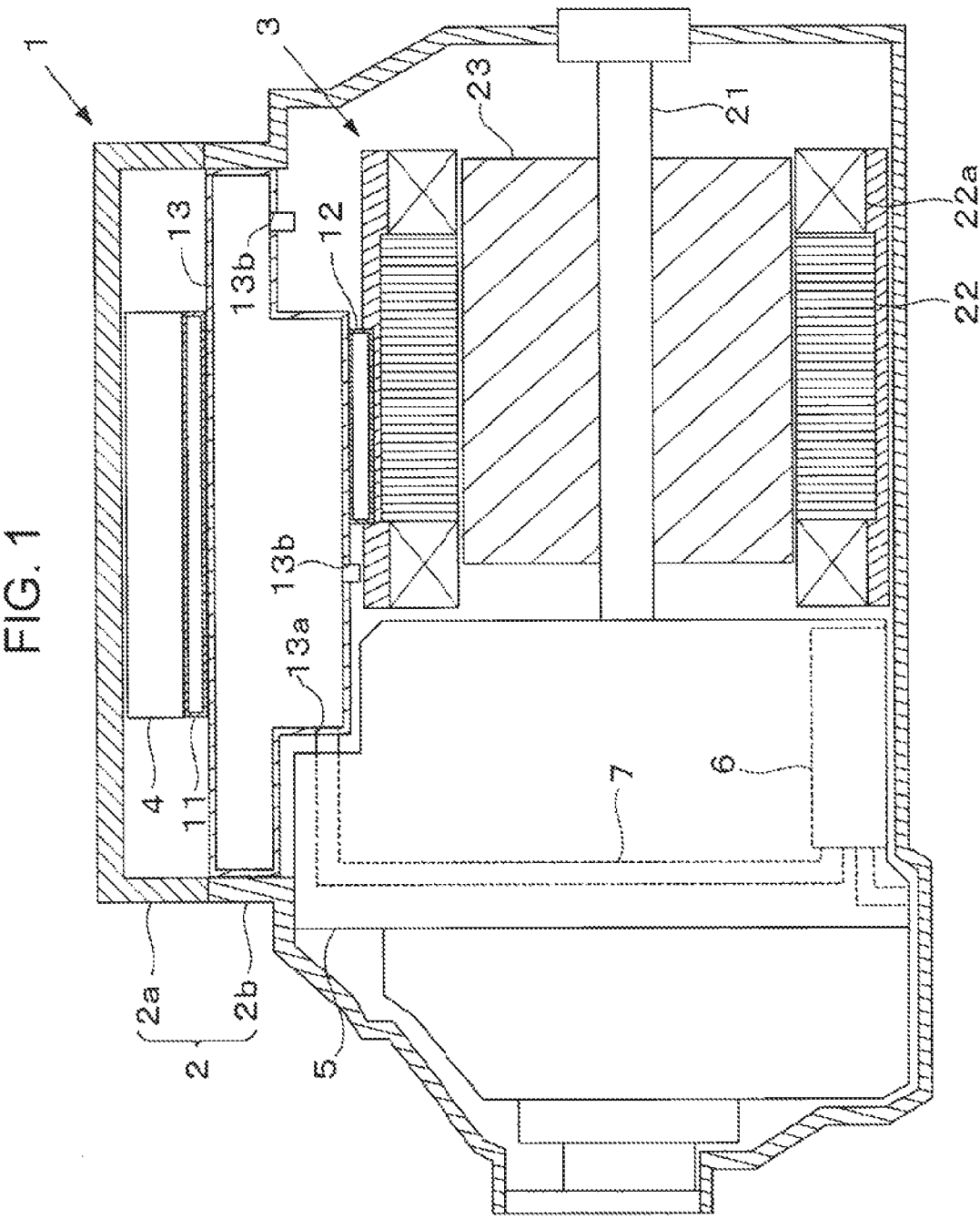
FIG. 1 illustrates the structure of a main part of an integrated rotating electric apparatus according to an embodiment of the present disclosure.

Hereinafter, an embodiment of the present disclosure will be described with reference to the drawings. FIG. 1 illustrates the structure of a main part of an integrated rotating electric apparatus 1 according to an embodiment of the present disclosure. FIG. 2 illustrates the main part shown in FIG. 1, as viewed from the right side of FIG. 1. Referring to FIG. 1, the integrated rotating electric apparatus 1 includes a casing 2 that is composed of an upper member 2a and a lower member 2b, a rotating electric machine (hereinafter, referred to as "motor") 3, a drive unit (hereinafter, referred to as "PDU") 4 that supplies driving electric power to the motor 3, a gear mechanism 5 that transmits output torque of the motor 3, and a cooling device that cools the motor 3 and the PDU 4. The casing 2 accommodates the motor 3, the PDU 4, the gear mechanism 5, and the cooling device. The cooling device includes a water cooling system and an oil cooling system. The water cooling system includes first and second water jackets 11 and 12 and cools the motor 3 and the PDU 4 by using cooling water. The oil cooling system includes a storage chamber 13 of cooling oil and drips the cooling oil onto the motor 3.

The storage chamber 13 includes an inlet hole 13a, through which cooling oil flows into the storage chamber 13, and four dripping holes 13b for dripping cooling oil stored in the storage chamber 13. The stored cooling oil is dripped through the dripping holes 13b onto the motor 3. The storage chamber 13 is disposed above the motor 3 and below the PDU 4.

The first water jacket 11 is disposed directly below the PDU 4. The second water jacket 12 is disposed directly above the motor 3. The storage chamber 13 is disposed in a space between the first and second water jackets 11 and 12 so as to be adjacent to the first and second water jackets 11 and 12.

The motor 3 includes a shaft 21, a stator 22 around which a coil 22a is wound, and a rotor 23 disposed inside the stator 22 and fixed to the shaft 21. An oil pump 6, which is driven by output torque of the motor 3, is disposed in the gear mechanism 5. The oil pump 6 suctions lubrication oil stored in an oil pan, which is disposed in a lowest part of the gear mechanism 5, and supplies the lubrication oil to the storage chamber 13 via an oil channel 7. The lubrication oil stored in the storage chamber 13 is used as cooling oil for cooling the motor 3. The lubrication oil is also supplied, via oil channels (not shown), to an oil channel formed in the shaft 21 of the motor 3 and to portions of the gear mechanism 5 to be lubricated.

Figure 3A:
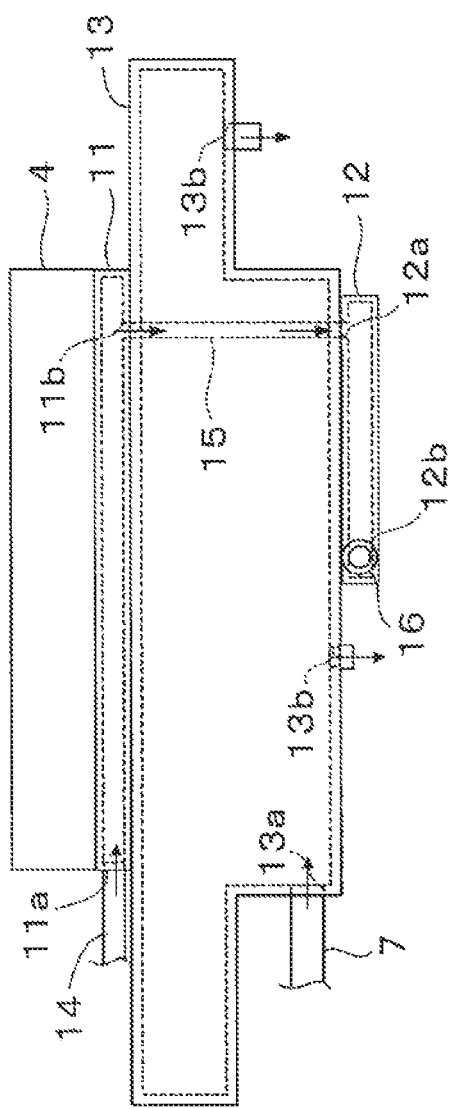
FIGS. 3A and 3B illustrate flows of cooling water and cooling oil in a water cooling system and an oil cooling system shown in FIG. 1.
Figure 3B:
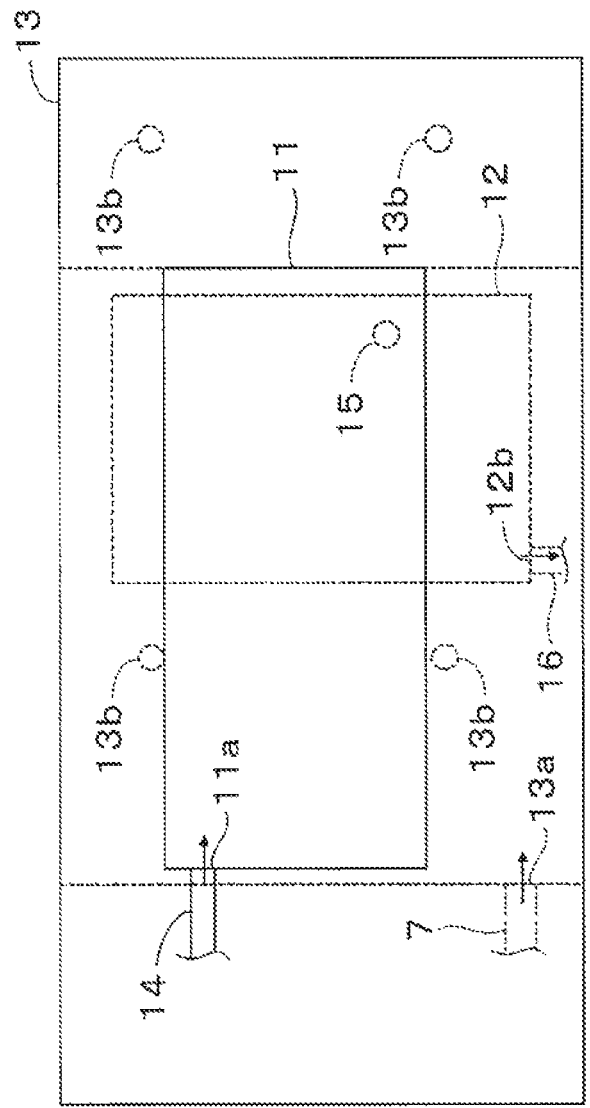

FIGS. 3A and 3B are respectively a side view and a plan view illustrating flows of cooling water and cooling oil in the water cooling system and the oil cooling system. The cooling oil flows from the oil channel 7 via the inlet hole 13a into the storage chamber 13 and is temporarily stored in the storage chamber 13. Then, the cooling oil is dripped from the dripping holes 13b. The dripped cooling oil is circulated to the oil pan that is disposed in the lowest part of the gear mechanism 5.

The water cooling system includes a water pump (not shown) outside of the casing 2. Cooling water is pressurized by the water pump and flows from a cooling water channel 14 via an inlet hole 11a into the first water jacket 11. Then, the cooling water flows from an outlet hole 11b into a cooling water channel 15. The cooling water channel 15 extends through the storage chamber 13 and is connected to the second water jacket 12. The cooling water flows from the cooling water channel 15 via an inlet hole 12a into the second water jacket 12. The cooling water in the second water jacket 12 flows via an outlet hole 12b to a cooling water channel 16. The cooling water channel 16 is connected to a cooling water channel that is helically formed in the motor 3 with the shaft 21 as the axis. The cooling water channel in the motor 3 is connected to a water pump via a radiator.

As a structure for circulating cooling water to the first and second water jackets 11 and 12 in the water cooling system, for example, it is possible to use a structure similar to that described in Japanese Unexamined Patent Application Publication No. 2011-182480, the entire contents of which are incorporated herein by reference.

As described above, with the present embodiment, the oil cooling system cools the motor 3, and the water cooling system cools the motor 3 and the PDU 4, which supplies driving electric power to the motor 3. Moreover, the cooling oil is temporarily stored in the storage chamber 13, which is disposed between the motor 3 and the PDU 4, and is cooled by the cooling water of the water cooling system. Accordingly, even when the motor 3 and the PDU 4 generate a large amount of heat, it is possible to obtain a sufficient cooling effect, in particular, by increasing the cooling effect of the cooling oil. Moreover, it is possible to suppress increase in the size of the apparatus, because the storage chamber 13 of cooling oil is disposed in a space between the motor 3 and the PDU 4.

Moreover, because the storage chamber 13 is disposed in a space between the first and second water jackets 11 and 12 so as to be adjacent to the first and second water jackets 11 and 12, heat exchange between the cooling water in the first and second water jackets 11 and 12 and the cooling oil in the storage chamber 13 is accelerated. Therefore, it is possible to increase the cooling effect of the cooling oil.

Furthermore, because lubrication oil of the gear mechanism 5 is used as cooling oil of the motor 3, it is not necessary to use an independent oil pump for supplying cooling oil to the storage chamber 13. Therefore, it is possible to simplify the structure of the apparatus.

The present disclosure is not limited to the embodiment described above and can be modified in various ways. For example, the shapes of the first and second water jackets 11 and 12 and the storage chamber 13 are not limited to those illustrated in the figures and may be modified as long as the object of the present disclosure can be achieved. An oil pump for supplying cooling oil to the oil cooling system is not limited to an oil pump that is driven by output torque of the motor 3. The oil pump may be driven by another motor. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. An integrated rotating electric apparatus comprising:
a rotating electric machine;
a drive unit that is disposed above the rotating electric machine and that supplies driving electric power to the rotating electric machine;
a cooling device that cools the rotating electric machine and the drive unit; and
a casing that accommodates the rotating electric machine, the drive unit, and the cooling device,
wherein the cooling device includes
an oil cooling system that drips cooling oil onto the rotating electric machine to cool the rotating electric machine, and
a water cooling system that cools the rotating electric machine and the drive unit by using cooling water,
wherein the oil cooling system includes a storage chamber disposed above the rotating electric machine and below the drive unit, the storage chamber being configured to temporarily store the cooling oil and including a plurality of dripping holes for dripping the cooling oil onto the rotating electric machine, and
wherein the cooling device is configured to cool the cooling oil stored in the storage chamber by using the cooling water of the water cooling system,
wherein the water cooling system includes a first water jacket disposed directly below the drive unit and a second water jacket disposed directly above the rotating electric machine,
wherein the storage chamber is disposed between the first and second water jackets so as to be adjacent to the first and second water jackets such that the first water jacket directly contacts an upper surface of the storage chamber and the second water jacket directly contacts a bottom surface of the storage chamber.

2. The integrated rotating electric apparatus according to claim 1, further comprising:
a gear mechanism that is disposed in a vicinity of the rotating electric machine and that transmits output torque of the rotating electric machine,
wherein the cooling oil is lubrication oil of the gear mechanism.

3. The integrated rotating electric apparatus according to claim 1,
wherein the storage chamber is disposed between the rotating electric machine and the drive unit.

4. The integrated rotating electric apparatus according to claim 1,
wherein the storage chamber is disposed adjoining to the first and second water jackets.

5. The integrated rotating electric apparatus according to claim 1,
wherein the first water jacket is connected to the second water jacket via a cooling water channel penetrating through the storage chamber.

* * * * *